United States Patent [19]

Adams

[11] 4,233,634
[45] Nov. 11, 1980

[54] VIDEO CAMERA WITH ADJUSTABLE MOUNT AND COUNTERBALANCE

[76] Inventor: Jay W. Adams, 937 E. Groton Dr., Burbank, Calif. 91504

[21] Appl. No.: 51,019

[22] Filed: Jun. 22, 1979

[51] Int. Cl.$^3$ .......................... H04N 5/24; H04N 5/26
[52] U.S. Cl. .................................. 358/229; 352/242; 352/243; 358/41; 358/55; 358/108; 358/185
[58] Field of Search ....................... 358/22, 41, 55, 87, 358/108, 185, 209, 210, 224, 225, 229; 354/288; 352/242, 243

[56] References Cited

U.S. PATENT DOCUMENTS 4,008,372 12/1977 Ueno et al. .............................. 358/

Primary Examiner—Robert L. Richardson
Attorney, Agent, or Firm—Wm. Jacquet Gribble

[57] ABSTRACT

A video camera tilt and pan head includes a bifurcated support which is free to pivot about a vertical axis for the "pan" action of the video camera. A camera cradle receives the video camera and the cradle is provided with slots and a tie-down bolt such that the camera is adjustable horizontally with respect to the cradle. The cradle is supported on transverse mounting pivots secured in the support. The pivots clamp in vertical cradle slots, enabling the cradle to be adjustable vertically with respect to the pivots. The pivots may be tubular to act as sight tubes to locate the cradle and camera with respect to the desired pivot axes. A tray extends from the cradle to receive weights to counterbalance the extension of the video camera beyond the transverse pivots. The camera exterior is indexed to indicate the point at which the axes of each of the red, green and blue receptors intersect the lens axis of the camera. This point establishes the desired path for tilt and pan axes. Motorized gear drives accomplish tilt and pan motions of one camera in response to the selective movement of like pan and tilt gears on a companion camera such that the companion camera and a camera fixed in the mount of the invention move in synchronism.

10 Claims, 11 Drawing Figures

CONVENTIONAL CAMERA HEAD

CONVENTIONAL VIDEO CAMERA OPTICS

CONVENTIONAL CAMERA

MASTER CAMERA

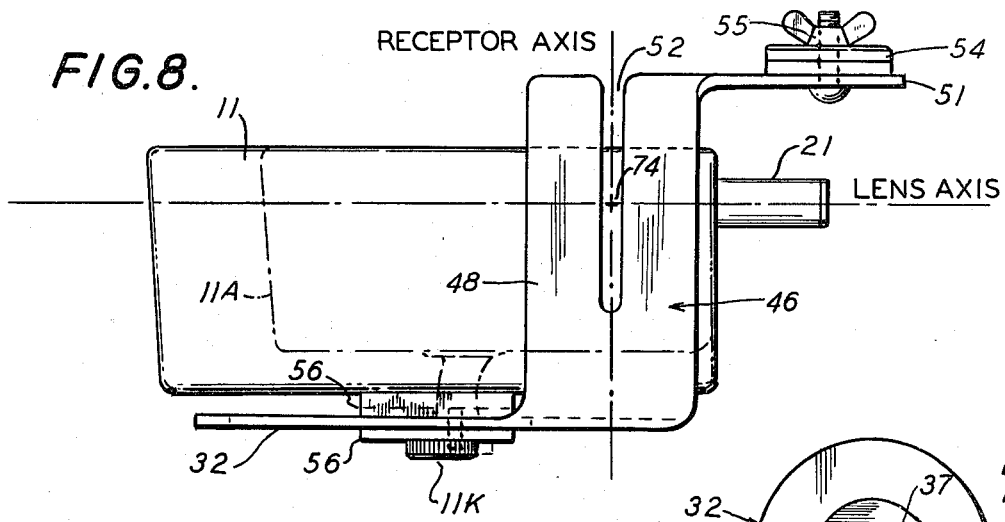
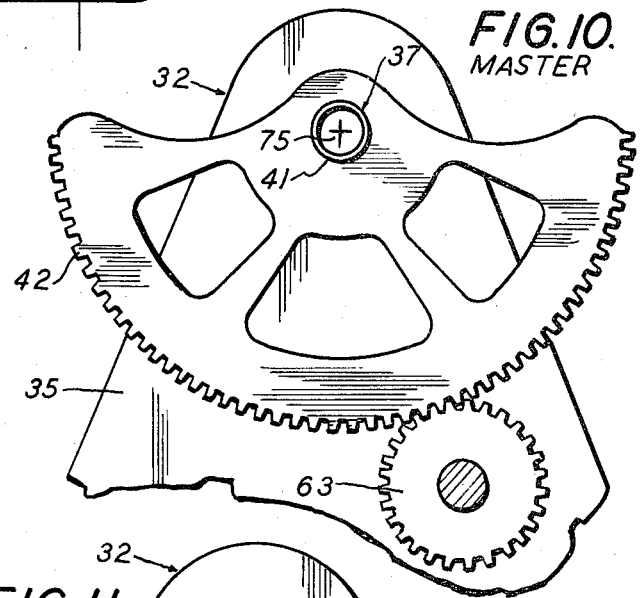
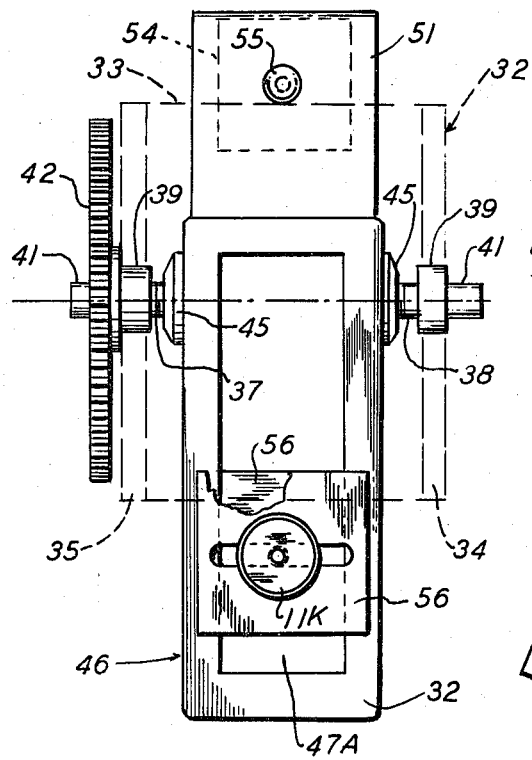
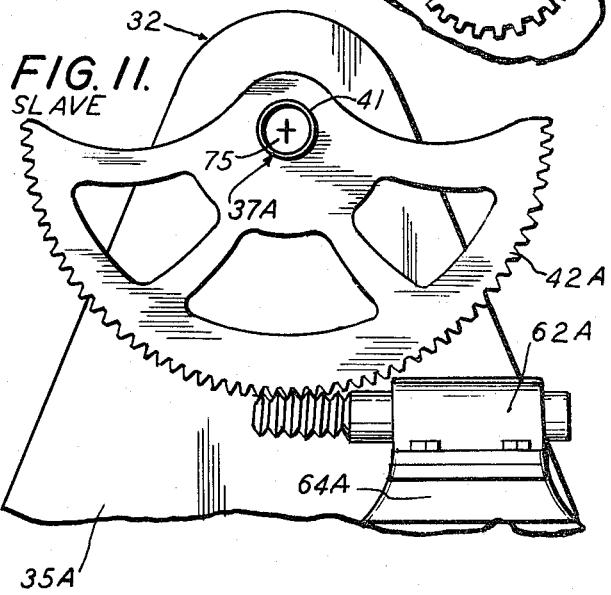

VIDEO CAMERA WITH ADJUSTABLE MOUNT AND COUNTERBALANCE

RELATED PATENTS

The instant application is related to my previous U.S. Pat. No. 4,092,673 issued May 30, 1978 entitled "Compatible Composite Image Process".

BACKGROUND OF THE INVENTION

The invention relates to the field of video chroma-key process and more particularly to such a process requiring "master" and "slave" video cameras wherein the conventional procedure is for the master video camera to focus upon live action whereas the slave camera focuses on a static display or set which may be to a different dimensional scale from the live action. One such process is described in my above-identified U.S. Pat. No. 4,092,673. Another such process is detailed in the patent to Van Slater U.S. Pat. No. 3,914,540, issued Oct. 21, 1975 and entitled "Optical Node Correcting Circuit". In both processes the movement of the video cameras which are focused on the live scene and on the static display must be synchronized in all motions. The basic video camera motions, like the cinema camera motions, are described as dollying, trucking, panning, tilting and camera lens zooming. Dollying and trucking relate to the movement of the camera pedestal longitudinally and transversely. Panning refers to a rotation of the camera itself about a vertical axis. Tilting refers to the rotation of the camera about horizontal axis. The present invention is related to the camera motions known as panning and tilting.

In the conventional video camera the incoming light is dispersed to red, green and blue receptors by means of a prism placed in the path of the lens axis. Heretofore, it was necessary to either electronically or mechanically compensate for the fact that in both pan and tilt operations of the conventional video camera the pivot axes for these motions have been off-axis from that optical point in the video camera defined by the intersection of the lens axis with the receptor axes of the color sensors, designated "the vertex".

Therefore the relative scale of the master camera set to the slave camera set has had to be a factor in determining the individual tilt and pan of the two cameras, since a "lever arm" motion is involved in either pan or tilt motion when the tilt or pan axis is removed from the point of optimum pivot set forth above. If the mounts on the pedestals for both cameras for a chroma-key process, such as that described in the above-mentioned previous patents, are such that the pan axis passes through the described coincidence point in the lens axis and the tilt axis passes through that same point, then no mathmatical adjustment is necessary if both of the cameras are equally tilted or panned on the camera mount.

The instant invention provides means for achieving simultaneous tilt and pan motions of two linked cameras without mathematically derived corrections for scale in a camera support within which the cameras may be mounted to correlate the tilt and pan pivot axes with the camera intersection point for camera lens and color receptor axes.

BRIEF SUMMARY OF THE INVENTION

The invention contemplates a camera support for cameras having camera lens and color receptor axes intersection points and comprising a camera support preferably having a vertical or "pan" pivot, and camera cradle pivot mounts horizontally aligned for tilt action. A camera cradle has means for adjustably securing the cradle to the cradle pivot mounts of the support and means for adjustably securing a camera for desired horizontal positioning in the cradle to correlate camera intersection point with an extension of the camera support vertical or "pan" pivot axis. The cradle with a camera may then be adjusted on the cradle pivot mounts to correlate camera intersection point with an extension of the camera support pivot mount axis for tilt motion.

In a preferred embodiment a counterbalance assembly is attached to the cradle, normally extending forwardly of the aligned cradle pivot mounts. The assembly may comprise a holder shelf fixed to the cradle and separate weight pieces which may selectively be added to the holder shelf to effect the desired counterbalance of the camera and cradle with respect to the horizontally extending tilt pivots.

In another embodiment one or both cradle pivot mounts may be horizontally apertured to define a sight tube to align an index mark on the camera with the pivot axis. The index mark on the camera indicates an extension to the camera case of the internal intersection point of the receptor and lens axes.

Any of the embodiments of the video camera mount of the invention simplifies linkage between the master and slave cameras in a video "chroma-key" process because each camera of the master-slave combination tilts and pans in direct synchronism with its campanion camera because of the unique camera support and camera cradle combination wherein the camera may be positioned such that the tilt and pan pivot axes passes through the vertex or color receptor and lens axes intersection point.

These and other advantages of the invention are apparent from the following detailed description and drawing in which:

FIG. 8 is a detailed side elevation of the camera cradle of the embodiment of FIG. 4;

FIG. 9 is a bottom plan view of the embodiment of FIG. 4 with the camera support mount shown in broken lines;

FIG. 10 is a fragmentary side elevation of the embodiment of FIG. 4 showing the cradle pivot rotation drive for the master camera, and FIG. 11 is a fragmentary side elevational view of the camera cradle pivot drive for a slave camera.

In the various Figures like reference numerals are used to designate like parts.

DESCRIPTION OF THE PREFERRED EMBODIMENTS

Figure 1:
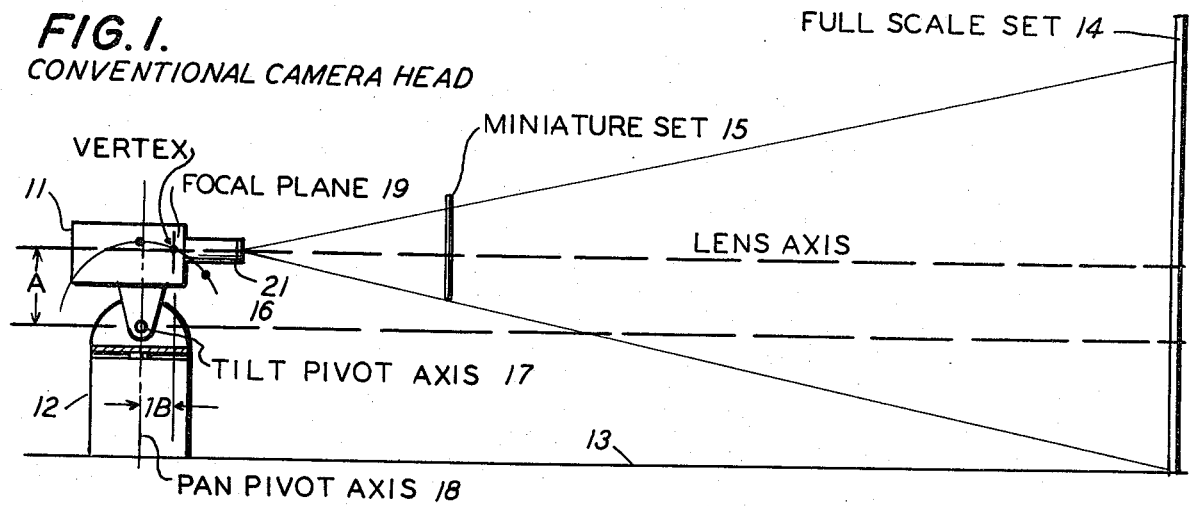
FIG. 1 is a schematic elevational view of a conventional camera head.

In order to understand the significance of the invention it is necessary to know the basic geometry of a conventional video camera head. Therefore, in FIGS. 1, 2 and 3 the basic relationships of the camera optical system to the tilt and pan mechanism are illustrated. For instance, in FIG. 1 a conventional video camera 11 is shown on a fixed mount 12 upon a support floor 13. A full scale set 14 is remote from camera 11. A miniature set 15 is nearer the video camera. The camera has a camera mount 16 with a horizontal or "tilt" pivot axis 17. In FIG. 1 the pan or scan axis is not shown. The effective focal plain 19 or "vertex" of the lens system is indicated behind the lens 21. The lens axis is displaced a distance "A" from the tilt pivot axis 17, the vertex a distance "1B".

Figure 2:
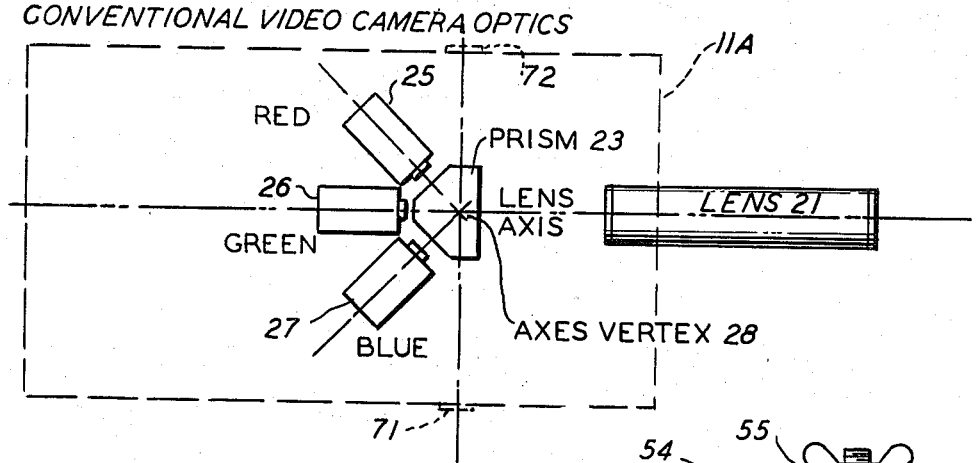
FIG. 2 is a diagram of the basic optics of a conventional video camera.

The FIG. 2 diagram shows a video camera lens 21 in a camera 11A in which a receptor prism 23 centered on the lens axis distributes perceived light to red, green and blue color receptors 25, 26 27 respectively. The point which is the coincidence of the receptor and lens axes is called the vertex 28. Focal plane 19 contains the vertex.

Figure 3:
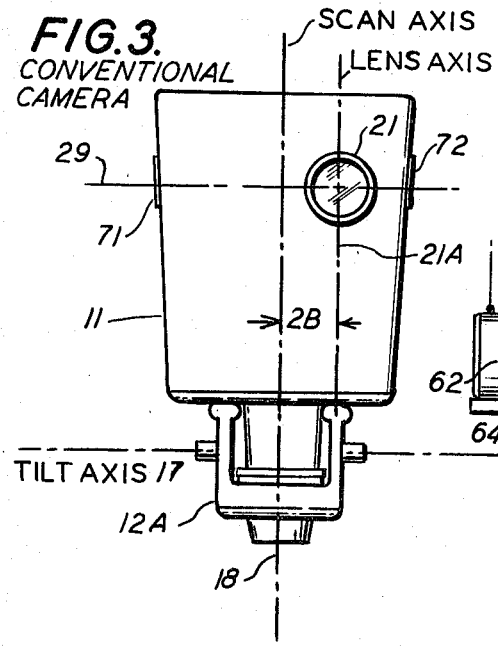
FIG. 3 is a schematic front elevational view of a conventional camera head.

The conventional camera 11 in FIG. 3 is shown on a conventional camera mount 12A having a tilt axis 17 and a pan or scan axis 18. Lens 21 has an axis 21A displaced from scan axis 18. Tilt axis 17 is also displaced from a horizontal line projection 29 of the vertex. Therefore, as camera 11 in FIG. 1 is tilted around pivot axis 17 the vertex position indicated by the heavy dots is displaced in varying degrees vertically from the pivot axis. Similarly, in panning or scanning, varying displacement of the vertex with respect to the pan axis 18 occurs. Therefore, any linkage between a master camera and a slave camera of conventional design must constantly accommodate the varying degrees of vertex displacement from rotation about the tilt and pan axes in the proportion of the master set size to the miniature set size.

Figure 4:
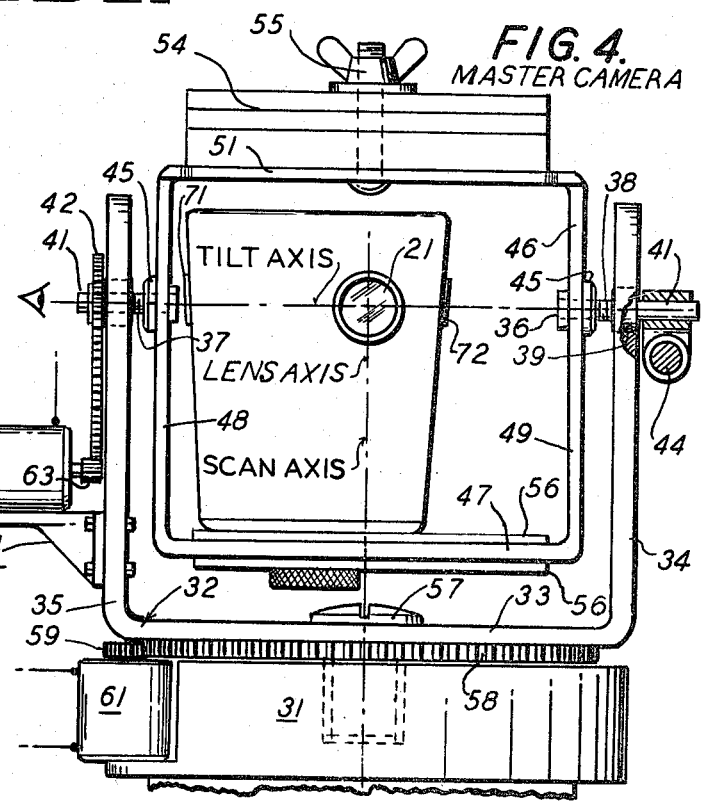
FIG. 4 is a front elevational view of a video camera mount in accordance with the invention, partly broken away.

The embodiment of FIG. 4 provides a combination of elements wherein the camera mount tilt axis and scan axis both pass through the vertex or point of convergence of the lens axis and the color receptor axes. While the representation of the color receptors in FIG. 2 is schematic, the conventional receptors do not vary in concept from the illustrated arrangement. For instance, a conventional "Plumbicon" tube assembly utilizes a 3 prism assembly instead of the single prism 23 shown in FIG. 2 and the receptor axes angle for red and blue receptors to the lens axis may differ from that shown in accordance with the prisms used.

To achieve the desired arrangement the invention employs for a paired video camera a conventional camera pedestal 31 which pivotably holds a bifurcated camera support 32 having a base 33 and vertical support forks 34,35. Tubular cradle mount pivots 37,38 with heads 36 are journaled by bearings such as bearing 39 in the upper region of each fork 34,35. Each cradle mount pivot projects horizontally outwardly from its respective fork in a drive portion 41. Pivot 37 has attached to its drive portion a segmented gear 42. The drive portion of cradle mount pivot 38 has attached thereto a manual control handle 44.

The pivots extend horizontally inwardly to retain a camera cradle 46 centrally of the camera support by means of clamp nuts 45 and mount pivot heads 36. The camera cradle has a base 47 with a wide slot 47A (see FIG. 9) and transversely spaced vertical limbs 48,49 which are slotted vertically by slots 52 in which the pivots are adjustable. A weight platform 51 extends forwardly from the limbs above the limbs to receive a plurality of counterbalance weights 54 secured by bolt and wing nut assembly 55. Upper and lower plates 56 span the slot to adjustably secure a video camera on the base by means of a knurled nut 11K.

A journal screw 57 passes through camera support base 33 and is secured in camera pedestal 31 in conventional fashion so the camera support may rotate in a horizontal plane with respect to the pedestal. In the case of a master camera a drive gear 58 is fixed horizontally to support base 33 and engages with a driven gear 59 of a rotation sensor 61 secured in place on camera pedestal 31. Similarly, a rotation sensor 62 has a gear 63 engaged with segmented vertical gear 42 of cradle mount pivot 37. Sensor 62 resides upon a shelf 64 secured to fork 35.

Figure 6:
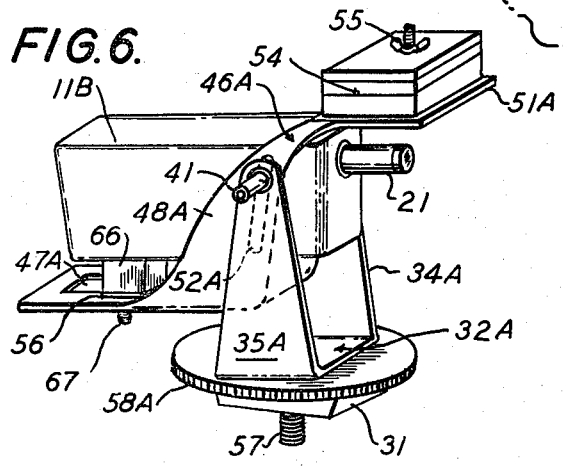
FIG. 6 is a perspective view of an alternative embodiment of the camera mount.
Figure 7:
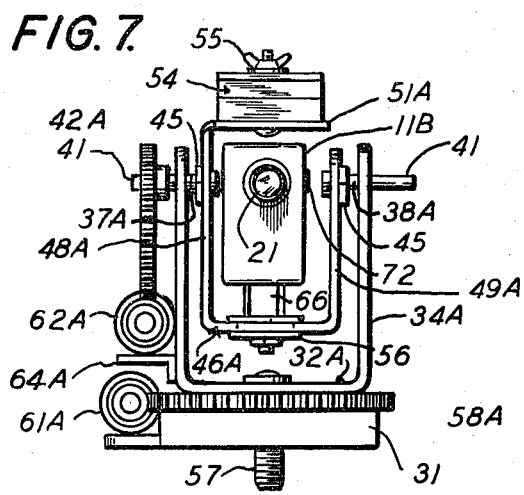
FIG. 7 is a front elevational view of the embodiment of FIG. 6 with pan and tilt actuating elements added.

In the case of the slave camera, as shown in an alternate embodiment in FIGS. 6 and 7, sensors 61 and 62 may be replaced by drive motors 61A, 62A responding to torque to the motion of the similar gears 42 and 58 to tilt and pan a slave camera 11B in direct correlation with the tilt and pan motions of the master camera. With the tilt and scan axes coinciding with the camera vertex it is only necessary to duplicate the angular displacement of the master and slave cameras to effect the scale-related change of images for both full scale and miniature scale sets (see FIG. 1).

It can be assumed that the alternate embodiment of the invention pictured in FIGS. 6 and 7 is for a slave camera. These two Figures show a conventional video camera 11B with a camera lens 21 and a lower protruding support 66 with a depending bolt 67 by which the camera 11B is secured to a camera cradle 46A. Like the previously described camera cradle 46, the cradle A has a wide slot 47A in its base 47 which is bridged by upper and lower plates 56 (as shown in FIG. 9 with respect to the first described embodiment) such that camera 11B may be adjusted with respect to tubular cradle mount pivots 37A, 38A, in accordance with externally visible indices on the camera side walls which indicate the internal vertex 28 of the axes as set forth with respect to FIG. 2. Such indices may be small external wafers with a plus mark thereon such as the wafers 71,72 shown in FIGS. 2 and 4. The plus mark on the index wafer, visible in FIG. 8 at 74, is indicated at 75 in FIGS. 10 and 11. All are discernable through the tubular mount pivots, which act as sight tubes as well as mounts.

In the embodiment of FIGS. 6 & 7 a slot 52A is shown by dotted lines in the limbs 48A, 49A of a camera cradle 46A similar in some respects to the cradle 46 of FIG. 4. Cradle limbs 48A and 49A are slotted instead of being befurcated and weight platform 51A is cantilevered from limb 48A only. In other respects the cradles of the two embodiments are similar, being vertically adjustable with respect to their respective tubular mount pivots 37, 38 while the camera itself is horizontally adjustable with respect to the cradle. This arrangement assures that the vertical pivot axes of support 32 and the horizontal axis of the pivots coincide with the axes vertex 28 of the camera.

In the orientation of FIGS. 6 and 7 electrical motors 61A and 62A replace the sensors 61, 62 of the master camera arrangement such that arcuate motion sensed when the master camera tilts or scans is imposed upon motors 61A and 62A to cause simultaneous tilt and scan or pan motion in the slave camera.

Figure 5:
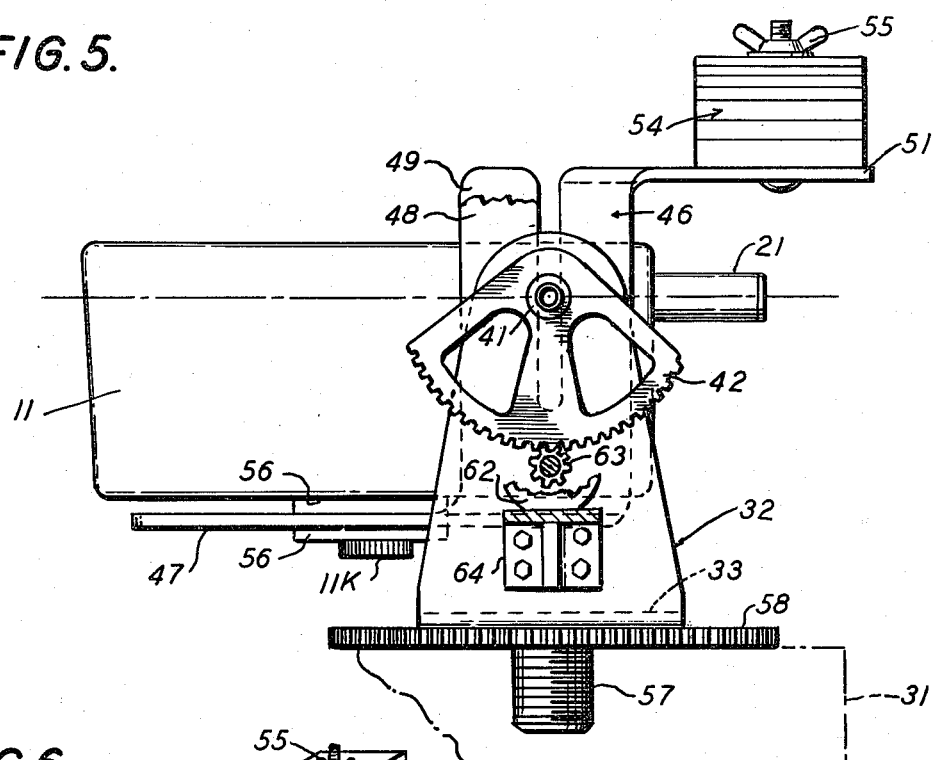
FIG. 5 is a side elevational view of the mount of FIG. 4.

In either slave or master camera configuration the inventive device affords easy positioning of a video camera to achieve coincidence between the tilt and pan axes and the axes vertex of the camera as defined in FIG. 2. Since the cradle mount pivots are tubular, they act as sight tubes to insure this correct positioning of the camera with respect to the camera support and the camera cradle for proper master-slave operation. In FIGS. 5, 8 and 9 the master camera arrangement is shown in detail: FIG. 5 as an assembled unit, FIG. 8 with the camera fixed in the bare cradle and FIG. 9 with the cradle assembly shown with respect to the phantom lined camera support.

As can be seen best in FIGS. 5 and 8 camera cradle 46 has vertical limbs 48, 49 each of which is horizontally bifurcated by vertical slot 52 which has the same function as the slot 52A of the embodiment of FIG. 6. In each the slot receives a cradle mount pivot 37, 38 which is locked in proper vertical orientation with respect to the camera in the cradle by means of the inner clamping nuts 45 and the pivot heads 36 as best seen in FIGS. 4, 7 and 9. The clamping nuts may be loosened to adjust the cradle vertically with respect to the camera support while knurled spinner nut 11K may be loosened or tightened to fix the camera horizontally on base 47 of the cradle,. In additin to the camera 11 of FIGS. 4, 5 and 8, a camera 11 A is shown in FIG. 8 in phantom lines, to illustrate the adaptability of the cradle to differing cameras so long as each has a base screw 67 to which the knurled nut 11K can be secured.

While master and slave camera heads have been shown as differing in some respects, the heads for both may be substantially identical except for gear configuration, distinctions between motion sensors and drive motors and the presence of the pan handle on the master camera head outside the cradle support.

The invention thus provides means whereby conventional video cameras may bear external indices of the location of the axes vertex of the camera lens system such that the camera may be positioned to insure that the tilt and pan axes of the camera always pass through the axes vertex of the camera mount. While the embodiments shown exemplify the invention they do not exhaust the scope of the invention. It is therefore desired that the invention be measured by the appended claims rather than by the illustrative disclosure above.

I claim:

1. A camera support for a video camera having a lens axis and color receptors axes intersection point and comprising a vertical axis pivot for said support, a camera cradle, means for securing said camera to said cradle, means for horizontally adjusting said cradled camera with respect to said support such that a vertical axis pivot extension passes through said camera axes intersection point, transversely aligned horizontal cradle mount pivots on said camera support, transversely spaced pivot receivers on said cradle, means for adjusting said cradle vertically with respect to said mount pivots such that a horizontal pivot axis extension passes through said camera axes intersection point, and bias means for counterbalancing said camera with respect to said transversely aligned horizontal pivots.

2. A camera cradle assembly in accordance with claim 1 further comprising graphic indices on outer walls of said camera indicating the location of said camera lens axis and receptor axes intersection point, and closed configuration walls central of a horizontal axis pivot defining a sighting tube in said pivot adapted to align said pivot axis with said camera intersection point as indicated by said graphic indices on said camera exterior.

3. A camera cradle assembly in accordance with claim 1 wherein said biasing means comprises a plurality of separable weights, a weight holder fixed to said cradle remote from said horizontal axis mounts pivots, and means for securing said weights to said holder.

4. A camera cradle assembly in accordance with claim 3 wherein said holder comprises a holder shelf cantilevered from one of said transversely spaced uprights and displaced vertically from said horizontal axis mount pivots to reside above a cradled camera.

5. A camera support in accordance with claim 1 wherein said means for adjusting said cradle vertically with respect to said mount pivots comprises transversely spaced vertical uprights on said cradle, vertically elongate walls in each of said uprights defining pivot receiving slots, threaded portions of each of said horizontal axis mount pivots, and threaded clamps on the threaded portion of each mount pivot adapted to fix said cradle with respect to said camera support.

6. A camera cradle assembly for use with a video camera having a lens axis and color receptor axes intersecting point and a downwardly depending camera anchor and a bifurcated camera support with a vertical axis pivot and comprising a cradle base, parallel spaced walls in the base defining a base slot adapted to receive said camera anchor for horizontal adjustment thereof to achieve alignment of said camera axes intersecting point with said vertical axis pivot, transversely aligned horizontal axis cradle pivots on said bifurcated camera support spaced upwardly along said support, transversely spaced uprights on said cradle rising above said cradle base, vertically elongate spaced parallel walls in each of said spaced uprights defining pivot receiver slots, means for adjustably fixing said cradle vertically with respect to said support pivots to achieve alignment of said camera axes converging point with said horizontal axis pivots, and biasing means for counterbalancing the camera with respect to the pivots.

7. A camera cradle assembly in accordance with claim 6 further comprising graphic indices on outer walls of said camera indicating the location of said camera lens axis and color receptor axes intersecting point, and closed configuration walls central of a horizontal axis mount pivot defining a sighting tube in said mount pivot adapted to align said mount pivot axis with said intersecting point as indicated by said graphic indices on said camera exterior.

8. A camera cradle assembly in accordance with claim 6 wherein said biasing means comprises a plurality of separable weights, a weight holder fixed to said cradle remote from said horizontal axis mount pivots, and means for securing said weights to said holder.

9. A camera cradle assembly in accordance with claim 8 wherein said holder comprises a holder shelf cantilevered from one of said transversely spaced cradle uprights and displaced vertically from said horizontal axis mount pivots to reside above a cradled camera.

10. A camera cradle assembly for use with a video camera assembly having a lens axis and plural color receptor axes vertex and a camera with a downwardly depending camera anchor and a bifurcated camera support with a vertical axis pivot and comprising a cradle base, parallel spaced walls in the base defining a base slot adapted to receive said camera anchor for horizontal adjustment thereof to achieve alignment of said camera axes vertex with said vertical axis pivot, transversely aligned horizontal axis cradle pivots on said bifurcated camera support spaced upwardly along said support, transversely spaced uprights on said cradle rising above said cradle base, vertically elongate spaced parallel walls in each of said spaced uprights defining pivot receiver slots, means for adjustably fixing said cradle vertically with respect to said support pivots to achieve alignment of said camera vertex with said horizontal axis pivots; graphic indices on outer walls of said camera indicating the location of said camera lens axis and color receptor axes vertex, and closed configuration walls central of a horizontal axis mount pivot defining a sighting tube in said mount pivot adapted to align said mount pivot axis with said vertex as indicated by said graphic indices on said camera exterior; and biasing means for counterbalancing the camera with respect to the pivots including separable weights, a weight holder on said cradle remote from said horizontal axis mount pivots, and weight securing means; and means for actuating camera support motion about its vertical axis pivot and means for actuating rotation of said horizontal axis cradle pivots to tilt said cradle and said contained camera.

* * * * *